No. 809,358. PATENTED JAN. 9, 1906.
L. L. CONKEY.
VETERINARY SURGEON'S TABLE.
APPLICATION FILED FEB. 1, 1905.
2 SHEETS—SHEET 2.
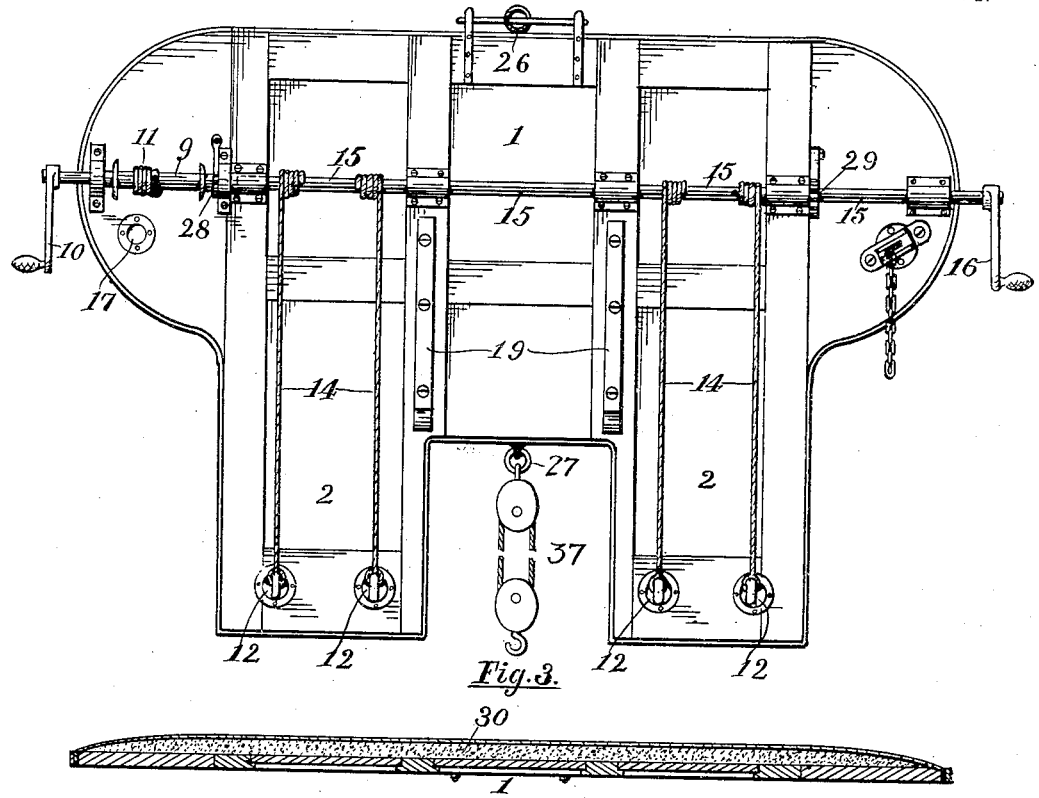
Fig. 3.
Fig. 5.
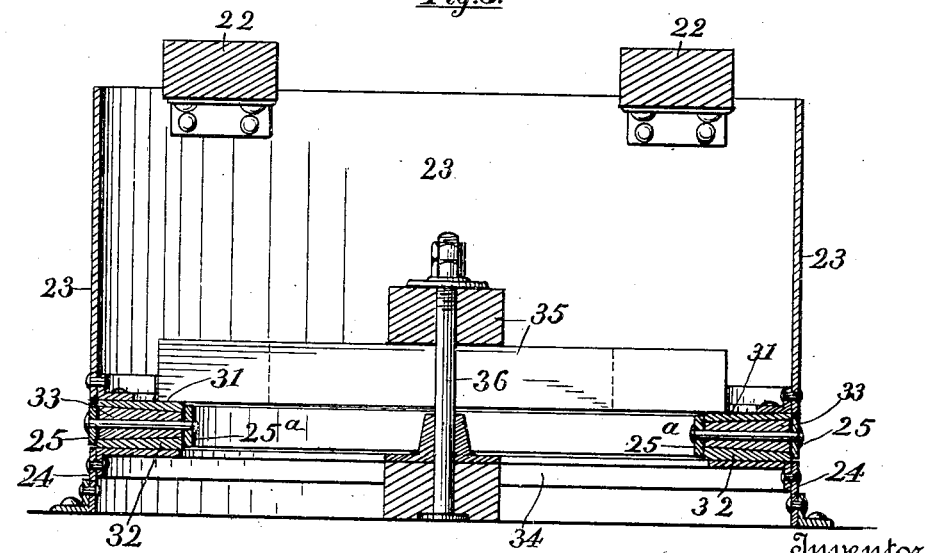
Fig. 4.
Witnesses
Edward R Monroe
Georgiana Chase
Inventor
Leonard L. Conkey
By Luther V. Moulton
Attorney

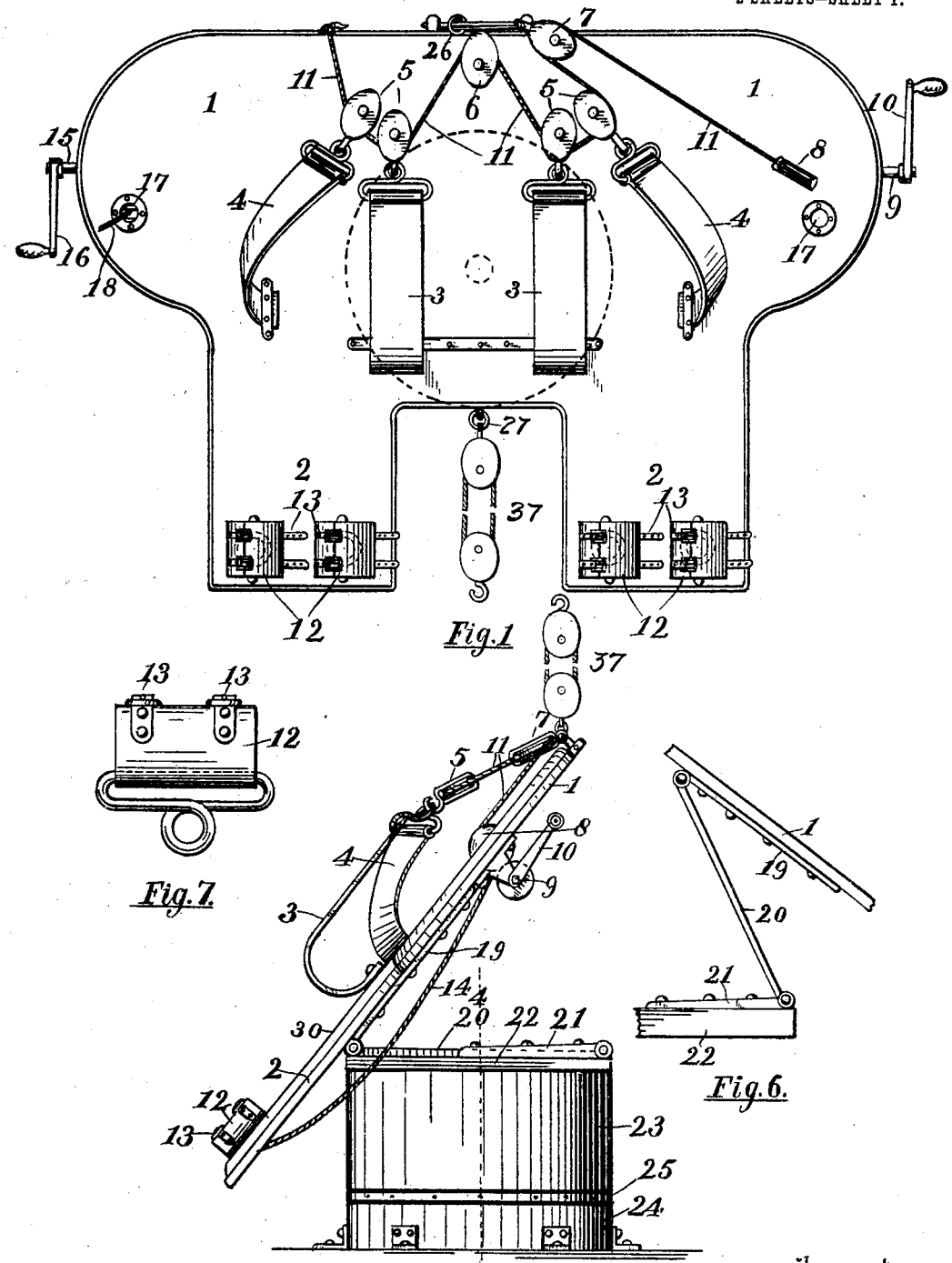

UNITED STATES PATENT OFFICE.

LEONARD L. CONKEY, OF GRAND RAPIDS, MICHIGAN.

VETERINARY SURGEON'S TABLE.

No. 809,358.  Specification of Letters Patent.  Patented Jan. 9, 1906.

Application filed February 1, 1905. Serial No. 243,630.

*To all whom it may concern:*

Be it known that I, LEONARD L. CONKEY, a citizen of the United States, residing at Grand Rapids, in the county of Kent and State of Michigan, have invented certain new and useful Improvements in Veterinary Surgeons' Tables; and I do hereby declare the following to be a full, clear, and exact description of the invention, such as will enable others skilled in the art to which it appertains to make and use the same.

My invention relates to improvements in veterinary surgeons' tables; and its object is to provide a device having various new and useful features, hereinafter more fully described, and particularly pointed out in the claims, reference being had to the accompanying drawings, in which—

Figure 1 is a plan view of a device embodying my invention; Fig. 2, a side elevation of the same with the platform turned up at an angle; Fig. 3, an inverted plan of the platform detached from its support; Fig. 4, an enlarged vertical section of the platform-supporting means, taken on the line 4 4 of Fig. 2; Fig. 5, a section of the platform, showing the padding on the same; Fig. 6, a detail of the hinge mechanism connecting the platform and its support, and Fig. 7 an enlarged detail of one of the leg-bands.

Like numbers refer to like parts in all of the figures.

The platform to support the animal consists of a body portion 1 and two leg portions 2, the leg portions being spaced apart to provide a recess between them for the operator to stand in.

The device is provided with straps 3, attached at one end to the platform and adapted to extend over the middle portion of the animal, and two other straps 4, also attached to the platform at one end and respectively adapted to extend over the shoulders and hams of the animal. These straps 3 and 4 are each provided at their free end with pulleys 5, attached thereto. To secure these straps in place upon the animal so as to hold the same immovable on the platform, two other pulleys 6 and 7 are attached to the upper edge of the platform, and a cord 11 is attached at one end to the platform and thence engages the pulleys 5 on two of the straps 4 and 3 and thence extends around the pulley 6, and from thence engages the pulleys 5 on the other straps 3 and 4, and thence extends around the pulley 7, and from thence over a pulley 8, arranged in an opening in the platform, and is then wound upon a shaft 9 by means of a crank 10, the shaft being held from turning backward by means of a pawl and ratchet 28. This shaft 9 is located in bearings on the under side of the platform, as shown in Fig. 3.

To hold the legs of the animal, bands 12 are provided, which are secured upon the legs of the animal by means of straps and buckles 13, and to these bands are attached cords 14, which cords extend through openings in the lower part of the leg portions 2 of the platform, and thence each cord 14 is carried to a shaft 15 and wound thereon by means of a crank 16, the shaft being held from turning backward by a pawl and ratchet 29. This shaft is also journaled upon the under side of the table, as shown in Fig. 3. To further secure the animal to the platform, openings 17 are provided in the platform near each end, through which the halter-strap or other like fastening may be extended and in like manner attached to the shafts 9 and 15 or otherwise secured, as most convenient. To support this platform and the part attached thereto in such manner that the same may be rotated about a vertical axis and also tilted from horizontal to vertical position, with either the back or feet of the animal downward, and to conveniently place the platform in position for securing the animal thereto when the latter is standing, I provide a support rotative about a vertical axis, to which this platform is attached by double-jointed hinges, preferably as illustrated in the drawings, in which 23 represents a tubular structure having a vertical axis and mounted on a suitable bed 24, on which bed is a circular track 32, traversed by a series of cone-rolls 33, mounted between concentric rings 25 and 25ᵃ, upon which rolls the rotative support 23 is freely rotative by means of a circular track 31, attached to the support and engaging the rolls. In the bed 24 is a suitable spider 34, in the axis of which is a bolt 36, extending through transverse beams 35, attached to the support 23, whereby the support is maintained in proper position and held down upon the bed. At the top of the support are secured parallel beams 22, to which the table is connected by means of double-jointed hinges consisting of upper members 19, attached to the table 1, and lower members 21, attached to the beams 22, the outer ends of each being normally adjacent to the respective ends of said beams. These hinge members are connected by middle hinge members 20, pivoted thereto at their respective ends. The platform can thus be tilted to a vertical position at either of the opposite sides of the support and with either the feet or the back of the animal downward or placed horizontally or inclined or rotated about the axis of the support at pleasure. To effect this tilting of the platform, I provide rings 26 and 27 at the respective sides, to which any suitable hoisting-tackle 37, having hooks 38 at each end, may be attached, one hook being attached to the ring 26 or to the ring 27, as occasion requires, and the other hook inserted in any convenient overhead support. (Not shown.)

To secure an animal upon this device, the platform is placed in a vertical position with the parts 22 downward and the animal standing beside the same. The bands 12 are then secured around the legs of the animal with the cords 14 slacked off. The cord 11 is also slacked and taken out of the pulleys. The straps 3 and 4 are then placed around the body of the animal and the cord 11 run through the pulleys, as shown. By tightening all of the cords the animal will be firmly held to the platform, which can now be turned down horizontal, inclined, reversed, or rotated, as occasion requires.

Having thus fully described my invention, what I claim, and desire to secure by Letters Patent, is—

1. The combination of a platform, means for securing an animal upon the same, a support for the platform, and a double-jointed hinge connecting the platform and support.

2. The combination of a platform, means for securing an animal upon the same, a support for the platform, means for rotating the support about a vertical axis, and a double-jointed hinge connecting the platform and support.

3. The combination of a platform, means for securing an animal upon the same, a support for the platform, a double-jointed hinge connecting the platform and support, and a hoisting-tackle adapted to be attached to either side of the platform to elevate the same.

4. The combination of a platform, means for supporting the platform in a vertical position, means for supporting the same in a horizontal position, straps to engage the body of an animal and attached to the platform at one end, pulleys on the free ends of the straps, a cord engaging the pulleys, means for adjusting the cord, bands adapted to be attached to the legs of an animal, cords attached to the bands, and means for adjusting the said cords.

5. The combination of a platform, means for supporting the same in either a vertical, or an inclined position, means for supporting the platform in a horizontal position, straps attached at one end to the platform, pulleys on the free ends of the straps, pulleys on the platform, a cord attached to the platform and successively engaging said pulleys, a shaft journaled on the platform on which shaft the cord is wound, a crank on the shaft, a pawl and ratchet to hold the shaft, and means for securing the legs of the animal to the platform.

6. The combination of a platform, means for adjustably supporting the platform, straps attached to the platform at one end, pulleys attached to the free ends of the straps, pulleys attached to the platform, a cord attached to the platform at one end and successively engaging the pulleys, a shaft on which the cord is wound, means for rotating and holding the shaft, bands to attach to the legs of the animal, cords attached to the bands, a shaft on which the cords are wound, and means for rotating and holding the shaft.

7. The combination of a platform, a support for the platform and rotative on a vertical axis, double-jointed hinges connecting the platform and the support, four straps attached at one end to the platform, a pulley on each free end of each strap, two pulleys attached to the edge of the platform, a pulley in an opening in the platform, a cord attached to the platform at one end and thence extending through two of the strap-pulleys, thence through a platform-pulley, thence through the other two strap-pulleys, thence through the other platform-pulley, thence over the pulley in the opening, a shaft journaled on the platform, around which shaft the other end of the cord is wound, a crank and ratchet on the shaft, and a pawl engaging the ratchet.

8. The combination of a platform, means for attaching an animal to said platform, a support for said platform rotative on a vertical axis, an upper hinge member attached to the platform, a lower hinge member attached to the support, and a middle hinge member extending wholly across the top of the support and pivoted at its respective ends to the other hinge members.

9. The combination of a platform, means for adjustably supporting the same, straps to engage the body of an animal and attached to the platform at one end, a cord connected to the free end of said straps, a shaft on which the cord is wound, means for rotating and holding the shaft, bands to surround the legs of an animal, cords attached to the bands, a shaft on which the cords are wound, and means for rotating and holding the said shaft.

10. The combination of a bed having a circular track, rolls traversing the track, a rotative circular track above the rolls, a support mounted on the rotative track, a spider and center bolt to hold the support in place, transverse beams on the support, double-jointed hinges attached to the beams, a platform attached to the hinges, and means for securing an animal upon the platform.

In testimony whereof I affix my signature in presence of two witnesses.

LEONARD L. CONKEY.

Witnesses:
LUTHER V. MOULTON.
GEORGIANA CHACE.